April 14, 1953     A. H. LAMBACH     2,634,779
VEHICLE TIRE
Filed Jan. 25, 1949
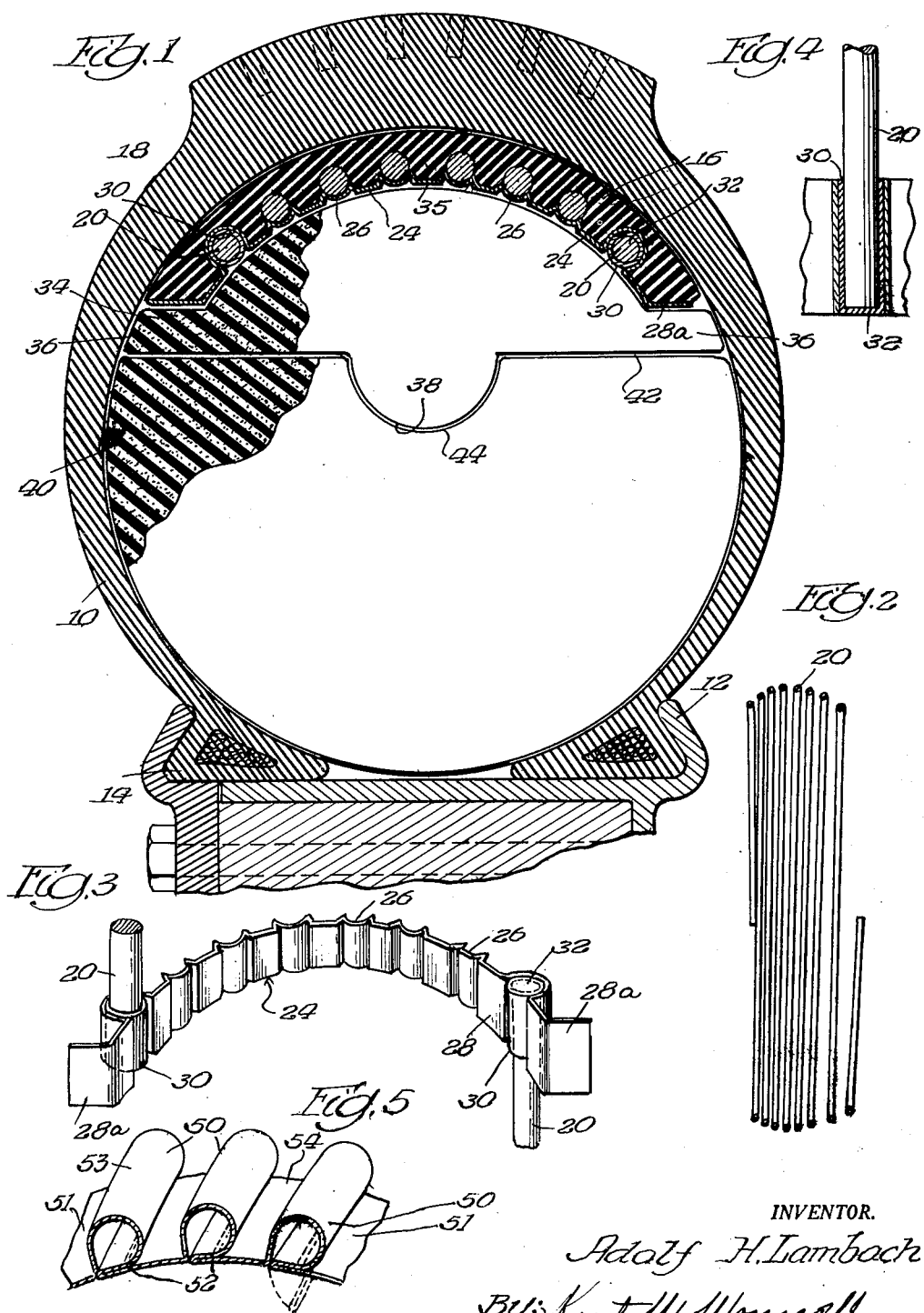
INVENTOR.
Adolf H. Lambach
By: Kurt W. Wonnell
Atty.

Patented Apr. 14, 1953

2,634,779

UNITED STATES PATENT OFFICE 2,634,779

VEHICLE TIRE

Adolf H. Lambach, Chicago, Ill.

Application January 25, 1949, Serial No. 72,693

5 Claims. (Cl. 152—204)

This invention relates in general to a vehicle tire and is more particularly described as a semi-solid filled casing for automobiles. A number of armoring protecting fillers for tire casings have been proposed, but in most of them, the sections are articulated transversely so that they cause undue wear and abrasion which is detrimental not only to the filler, but also to the casing itself. In the present invention, an inner protecting element extends around the periphery of the filler in a somewhat spiral form conforming to the transverse curvature of the tire, the loops of the element being substantially parallel and close together, but not so nearly adjacent that they tend to engage each other, or to produce abrasion within the filler, nor to become displaced with respect to each other.

An important object of the invention is to provide an armored filler for a vehicle tire casing in which the protecting element extends circularly around the tire adjacent the inner periphery of the casing;

A further object of the invention is to provide spacing means for holding the loops of the armoring element in substantially parallel relation and about the periphery of the tire;

Still a further object of the invention is to provide a section filler for cooperation with an outer circular armoring element in which both the armoring element and the filler may be readily inserted in place within a tire casing and may be removable therefrom with equal facility.

A still further object of the invention is to provide means for engaging the ends of the armoring element to prevent them creeping around the tire in either direction and to anchor them within the tire casing so that they will not produce any abrasion of the filler thereof.

A further object of the invention is to provide an armoring member with segmental resilient fillers which conform to and fill the spaces between the armoring member and have a definite and cooperative form with interengaging projections which together fill up the entire interior space of a tire casing so that when it is locked in place, the filler sections will be tightly contained within the casing.

Other objects of the invention will appear in the specification and will be apparent from the accompanying drawings in which, Fig. 1 is a sectional view of a tire in which the filler of this invention is mounted;

Fig. 2 is a sectional view of a spiral spring armoring member adapted to be used in the casing;

Fig. 3 is a perspective view showing a supporting clip to space the loops of the spring part and to engage the ends of the spiral spring;

Fig. 4 is a detail view of the engagement of one end of the spring by the spacing clip; and Fig. 5 is a sectional view of spacing means for the spring armoring part which may be made of fabric, plastic, or other materials.

Referring now more particularly to the drawings, a tire casing 10 of any desired or usual form is mounted upon a wheel or rim having a fixed flange 12 and a removable flange 14 for ease in mounting and releasing the tire.

At the inside of the casing which is substantially circular, is an assembly of three different sections of flexible resilient material preferably of the nature of sponge rubber, cellulose sponge or other fibrous material having elasticity, but retaining generally a fixed form or conformation. An outer segment 16 is circular in form to fit within the outer or crown portion of the casing and preferably has a spiral groove or channel 18 therein for seating an armoring spring 20. This section is curved transversely and is of substantially uniform thickness and extends a short distance beyond the sides of the tire tread so that the armoring spring is substantially spaced in position below the outer tread or crown of the tire.

The spiral armoring spring 20 is preferably made of metal but may be of fiber or other resilient and protective material which tends also to distribute weight, pressure, and protection equally around the periphery of the tire. In order to space the loops of the spring 20 apart and to hold them substantially in parallel relation, a number of clips 24 are inserted at spaced distances apart within the tire either before or after the spring 20 is applied thereto, this spacing clip having circular depressions or grooves 26 for receiving and seating the loops or turns of spring 20 therein and intermediate straight spacing portions 28 between the curved seating grooves 26.

At the ends of the clips are outwardly turned clip projections 28a extending over the ends of the segment 16 and tending to hold the clips and the segment in spaced position with respect to each other. One of these clips is located at the opposite extremities of the spring 20 and other clips are spaced equally about the tire to more nearly balance it. In the clip which engages the ends are additional pockets formed by shell members 30 having a bottom portion 32 and disposed oppositely at opposite sides of the clip to engage the opposite ends of the spring. These shell members 30 are preferably fastened in place by soldering, brazing, spot-welding or any other suitable manner.

A second segment 34 of the filler material has a transversely curved outer crown 35, projecting ends 36, and an inner central rounded projection 38. The crown portion 35 fits closely against the inner surface of the outer section 16 and against the inner peripheries of the turns of the spring 20, and the projecting ends 36 engage the clip projections 28a and the extremities of the section 16 holding these parts relatively in position. The sections 16 and 34 together fill less than the upper half of the tire opening and the remainder of the tire opening is filled by the filler section 40 which is circular in form conforming to more than half of the tire opening and has straight upper or outer edges 42 and a central groove 44 to engage the corresponding surfaces of the filler section 36 and the rounded projection 38 thereof. Thus the filler sections together make up and completely fill the entire opening of the tire casing so that when the casing is secured in place by its engaging flanges, the sections are under slight compression, thereby binding all of the parts tightly within the casing. Another way of explaining this is that the sections 16, 34 and 40 may be slightly oversize, but since they are flexible, resilient and compressible, they are bound tightly within the tire when the removable flange 14 is applied in mounting the tire and the filled casing therein.

Instead of making the spacer for the spiral armoring spring of metal or other stiff material, it may also be made of a fabric, plastic, or other material as illustrated in Fig. 5. With this material, the turns of the armoring material 20 are held apart in spaced relation by folds 50 in the fabric or other material 51, the folds being wrapped or partially wrapped about the turns of the spring 20, and the fabric may also be provided with transverse lines of stitching 52 at intervals so that portions 53 between the stitches may be wrapped around the spaced wires to form the folds and portions 54 between the folds 50 may constitute spacers for holding the wire turns apart.

With this construction, the outer segment 16 will fit within the spaced portions of the armoring spring which will be held in place by the fabric spacer. This fabric spacer and the metal spacing clips 24 may be secured to the armoring spring and also to the outer segment 16 by vulcanizing or by stitching the parts together, forming a separate unit insertable within the tire if desired.

With this construction, the spiral spring 20 adds its resilience to the natural resilience of the tire casing. This is backed by the compressible filler, and the casing is not compressed to the extent that the side walls are broken down or damaged under any ordinary circumstances. The turns of the spiral spring are separated from each other so that they do not cause undue wear or noise, the spring has its ends engaged so that it is substantially balanced in the wheel and produces no undue weight at any portion of the tire.

In mounting the filler within a tire, the first filler section 16, with or without the spring 20, is inserted in the tire and if the spring is omitted, the clips and spring are then inserted followed by the second filler section 34. The final or inner filler section 40 is then applied to the inner periphery of the casing, the casing is compressed and applied to the fastening rims which are secured in place in an ordinary well known manner.

With this construction, the tire will have a long life and it will be free from all the troubles of an inner tube since it is not subject to puncture or blow-out and even when the casing becomes badly worn, there will be no tendency of the filler to blow out since it is substantially retained in position by the spiral armoring spring 20.

While the preferred construction has been described in some detail, it should be regarded by way of illustration and example rather than a restriction or limitation thereof, as many changes in the construction, combination and arrangement of the parts may be made without departing from the spirit and scope of the invention.

I claim:

1. A vehicle tire, comprising an outer casing, a removable flexible resilient and sectional filler therefor, and an inner protecting element supported by the filler section adjacent the inner face of the casing but spaced from the casing, and the protecting element being spirally wound circumferentially of the tire in the casing with the turns thereof spaced apart and extending transversely within the casing adjacent the outer crown portion thereof.

2. An armoring element for a vehicle tire, comprising a removable spiral spring member the folds of which are curved in the form of a diametric spherical segment, and a plurality of spacing clips for holding the turns of the element apart, one of the clips engaging both ends of the element.

3. A semi-solid armored vehicle tire comprising a casing, a spiral spring armoring element in the form of a diametric spherical segment, fastening clips having spaced loops for engaging the turns of the spring and holding them in spaced apart relation within the tire, a segmental resilient filler comprising one section conforming to the spaced apart turns of the armoring element and extending partially between them to space the spring from the casing adjacent the crown thereof and engaging the ends of the fastening clips, another segment extending within the fastening clips and engaging the ends thereof, and other segmental filler means completing the inner space within the casing.

4. An armoring filler for a vehicle tire, comprising a spiral spring member having loops thereof spaced apart and in the form of a diametric spherical segment to conform to the inner crown surface of a casing, a plurality of spaced fastening clips for holding the turns of the spring element spaced apart in the said spiral relation, and means forming a pocket in connection with at least one of the fastening clips for seating the extremities of the spring element oppositely therein and holding the spring element in place.

5. An armoring filler for a tire casing, comprising a resilient spring member having spiral turns spaced apart and curved in the form of a spherical diametric segment to fit within the crown of a tire casing recess, a plurality of spacing clips to engage the turns of the spring element, a flexible resilient segment extending over the outer sides of the spring turns and conforming to the spacing relation of the fastening clips, another resilient segment conforming to the inner curvature of the clips and extending at the ends of the first segment to the inner curvature of a casing and having a centrally transverse centering projection, and segmental means having a recess conforming to the said centering projection of the second segment and adapted to fill the remainder of a tire casing having a substantially circular inner recessed cross section.

ADOLF H. LAMBACH.

References Cited in the file of this patent

UNITED STATES PATENTS

| Number | Name | Date |
|---|---|---|
| 636,536 | Liais | Nov. 7, 1899 |
| 1,039,427 | McCarty | Sept. 24, 1912 |
| 1,074,246 | Clark | Sept. 30, 1913 |
| 1,345,777 | Holdaway | July 6, 1920 |
| 1,822,556 | Barber | Sept. 8, 1931 |

FOREIGN PATENTS

| Number | Country | Date |
|---|---|---|
| 19,085 | Great Britain | 1903 |